United States Patent [19]
Zimmer

[11] Patent Number: 4,704,913
[45] Date of Patent: Nov. 10, 1987

[54] RACK DRIVE

[75] Inventor: Ernst Zimmer, Friedberg, Fed. Rep. of Germany

[73] Assignee: Kuka Schweissanlagen+ Roboter GmbH, Augsburg, Fed. Rep. of Germany

[21] Appl. No.: 844,464

[22] Filed: Mar. 26, 1986

[30] Foreign Application Priority Data

Mar. 26, 1985 [EP] European Pat. Off. ........... 85103597

[51] Int. Cl.$^4$ ..................... F16H 19/04; F16H 35/08; B23Q 11/08
[52] U.S. Cl. .................................... 74/89.17; 74/396; 74/566
[58] Field of Search .................... 74/29, 31, 33, 89.11, 74/89.12, 89.16, 89.17, 396, 422, 566

[56] References Cited

U.S. PATENT DOCUMENTS

| | | | |
|---|---|---|---|
| 848,578 | 3/1907 | Thelin | 74/566 X |
| 971,146 | 9/1910 | Repp | 74/566 X |
| 995,972 | 6/1911 | Larsen | 74/566 X |
| 1,679,912 | 8/1928 | Mondloch | 74/566 X |
| 2,741,141 | 4/1956 | De La Mater | 74/396 X |
| 2,760,571 | 8/1956 | Dayton | 74/566 X |
| 2,881,834 | 4/1959 | Thumim | 74/566 X |
| 3,753,375 | 8/1973 | Colletti | 74/396 X |
| 4,130,024 | 12/1978 | Hayasaka et al. | 74/29 |
| 4,446,751 | 5/1984 | Andreasen | 74/422 |
| 4,512,208 | 4/1985 | Lipinski et al. | 74/566 X |

FOREIGN PATENT DOCUMENTS

| | | |
|---|---|---|
| 1101096 | 9/1961 | Fed. Rep. of Germany . |
| 2910373 | 9/1980 | Fed. Rep. of Germany ..... 74/89.16 |
| 23151 | 2/1984 | Japan ................................... 74/89.17 |

Primary Examiner—Richard M. Lorence
Attorney, Agent, or Firm—Karl F. Ross; Herbert Dubno

[57] ABSTRACT

A rack-type drive for displacing a movable part longitudinally and horizontally relative to a stationary part has a longitudinally extending rack fixed on one of the parts which is formed above the rack with a longitudinal slot through which the rack is exposed upward and the other part is above the one part. A drive shaft rotatable about a horizontal and transverse upper axis on the other part is provided with a drive gear operatively engaged down through the slot with the rack. A pair of outer idler rollers generally below and longitudinally flanking the drive gear are rotatable about respective horizontal and transverse lower axes and a pair of inner idler rollers rotatable about the transverse axis on the drive shaft coaxially flank the drive gear and have outer peripheries lying relative to the axis radially outside the gear. A belt extending along and covering the slot to both longitudinal sides of the other part passes under the outer idler rollers and over the inner idler rollers in engagement with the peripheries thereof but out of contact with the drive gear.

18 Claims, 10 Drawing Figures

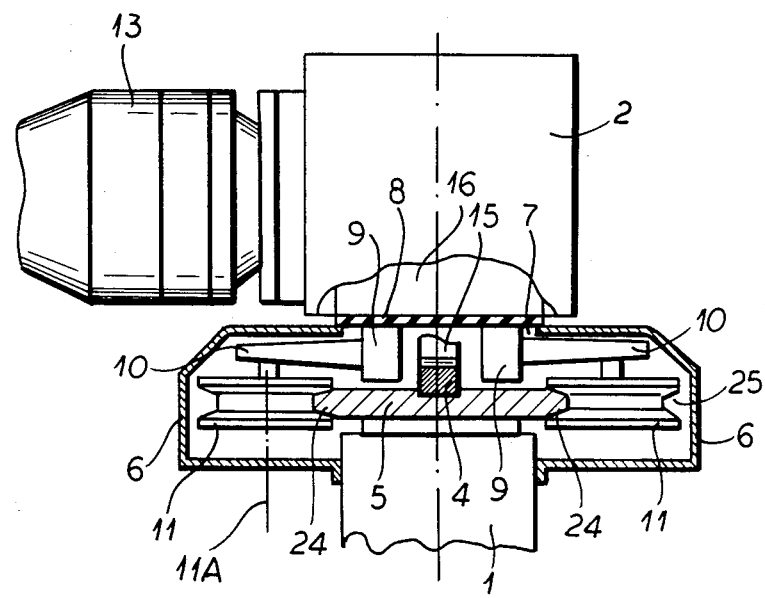
FIG. 4
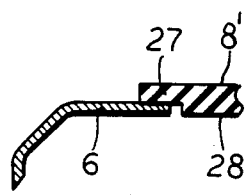
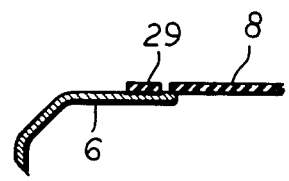
FIG. 5          FIG. 6

RACK DRIVE

FIELD OF THE INVENTION

The present invention relates to a rack drive. More particularly this invention concerns such a drive which can be used to move a machine tool or the like.

BACKGROUND OF THE INVENTION

A standard rack drive comprises a stationary part and a movable part displaceable along the stationary part. Normally the stationary part is formed with an upwardly open channel in which a rack is fixed, the rack being exposed upward through the slot of the channel. The movable part can travel along the stationary part and is provided with a drive gear engaging down through the slot with the rack.

In a standard arrangement an elongated toothed belt has a stretch that lies atop the channel over its slot, and is threaded through the movable part, passing under two outer and lower idler rollers and over a toothed wheel fixed on the shaft of the drive gear between and above the outer rollers. The belt therefore serves the function of covering the slot and thereby keeping the rack clean to both sides of the movable part, and of rotating the drive gear. Unfortunately such an arrangement cannot quite produce the accuracy of movement necessary for instance for machine-tool applications, as the long belt needed will inherently have some elasticity. In addition such long toothed belts are extremely difficult to manufacture, so the resultant equipment is quite expensive.

German patent No. 1,101,096 proposes a system for moving a boring quill in the head or tailstock of a lathe. A belt covers the rack and passes in a loop over a deflecting idler roller in the headstock. Beneath the deflecting roller is the drive gear which is independent of this roller. The range of motion here is relatively short. In addition converting a standard toothed-belt system to this type of arrangement requires replacing the belt with a longer one and generally rebuilding the entire device.

OBJECTS OF THE INVENTION

It is therefore an object of the present invention to provide an improved rack drive.

Another object is the provision of such a rack drive which overcomes the above-given disadvantages, that is which can be used as an upgrade of an existing toothed-belt system.

SUMMARY OF THE INVENTION

A rack-type drive for displacing a movable part longitudinally and horizontally relative to a stationary part has a longitudinally extending rack fixed on one of the parts which is formed above the rack with a longitudinal slot through which the rack is exposed upward and the other part is above the one part. A drive shaft rotatable about a horizontal and transverse upper axis on the other part is provided with a drive gear operatively engaged down through the slot with the rack. A pair of outer idler rollers generally below and longitudinally flanking the drive gear are rotatable about respective horizontal and transverse lower axes and according to the invention a pair of inner central rollers rotatable about the transverse axis on the drive shaft coaxially flank the drive gear and have outer peripheries lying relative to the axis radially outside the gear. A belt extending along and covering the slot to both longitudinal sides of the other part passes under the outer idler rollers and over the inner central rollers in engagement with the peripheries thereof but out of contact with the drive gear.

Thus this drive system can be substituted for a conventional toothed-belt one without changing the belt at all. The part with the deflecting rollers is merely switched with one having a smaller drive gear and the device is converted to a more accurate arrangement with the drive motor right on the movable part.

According to another feature of this invention a support pivotal on the other part about the upper transverse axis carries an intermediate gear rotatable about an intermediate axis parallel to the transverse axis and meshing with the drive gear and with the rack. An adjustment unit is provided for pivoting the support on the other part about the upper transverse axis and thereby adjusting the mesh of the intermediate gear with the rack and for locking it in any of a plurality of angularly offset positions on the other part. Thus the mesh of the intermediate gear with the rack can be adjusted.

More particularly according to this invention the adjustment unit is an element centered on and rotatable in the support about the intermediate axis and having an offcenter projection and the other part is formed with a slot in which the offcenter projection engages. This adjustment unit locks the element in any of a plurality of angularly offset positions corresponding to the positions of the support. This slot is elongated in a direction extending from the upper transverse axis to the intermediate axis. The support is a pair of arms flanking the drive and intermediate gears.

It is also possible according to this invention for the drive gear to mesh directly with the rack. In this case the one part is formed as a longitudinally extending channel that is transversely fully closed except at the slot. In addition the one part has a pair of longitudinally extending and upright side plates having upper edges defining and delimiting the slot and the inner rollers are formed with respective radially outwardly open grooves and the upper edges of the side plates project radially into the respective grooves. The rack has upwardly directed teeth having upper edges lying immediately below the upper edges of the side plates. Such an arrangement can be used where considerable force must be exerted.

According to another feature of this invention the drive shaft is formed unitarily with the drive gear and is tubular with two axially opposite ends and the drive has a drive motor fixed on the other part and having an output shaft projecting into one end of the tubular drive shaft and self-centering gear formations on the output shaft and one end of the drive shaft rotationally coupling same together. A bearing rotatably supports the one end of the drive shaft on the motor and another bearing rotatably supports the other end of the drive shaft on the other part.

The drive according to this invention has a guide rail extending longitudinally on the one part and having a pair of opposite guide edges, the rack being fixed atop the guide rail and guide rollers rotatable on the other part and riding on the rail and its edges. At least three such guide rollers engage each guide edge, one bearing downward, one bearing upward, and one bearing laterally.

For best protection of the parts of the drive the belt fits complementarily with the slot. This belt is flexible and is made of an elastomer-covered textile or of metal.

Such a drive can be used to very good effect on the relatively movable parts of a manipulator movable in at least two dimensions. Such a manipulator is described in commonly owned recently filed U.S. patent application Ser. No. 587,929, abandoned and refiled as Ser. Nos. 880,953, 634,753, 714,698, now U.S. Pat. Nos. 4,625,837, and 742,280.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 4 is a vertical cross section taken along line IV—IV of FIG. 1;

FIGS. 5 and 6 are vertical cross sections through details of variants of the instant invention;

SPECIFIC DESCRIPTION

Figure 1:
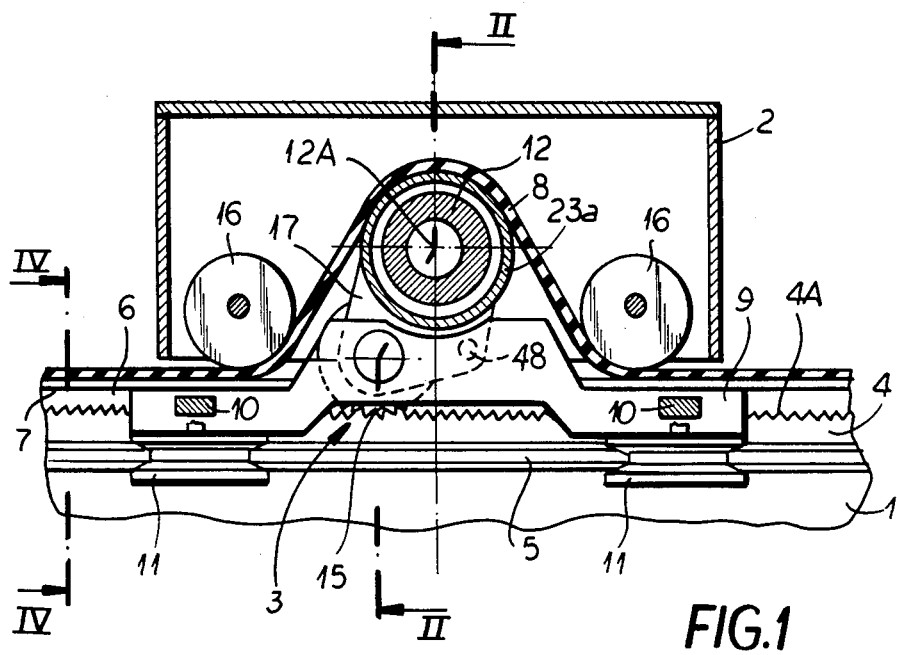
FIG. 1 is a vertical and longitudinal section through a first embodiment of the drive of the instant invention.
Figure 2:
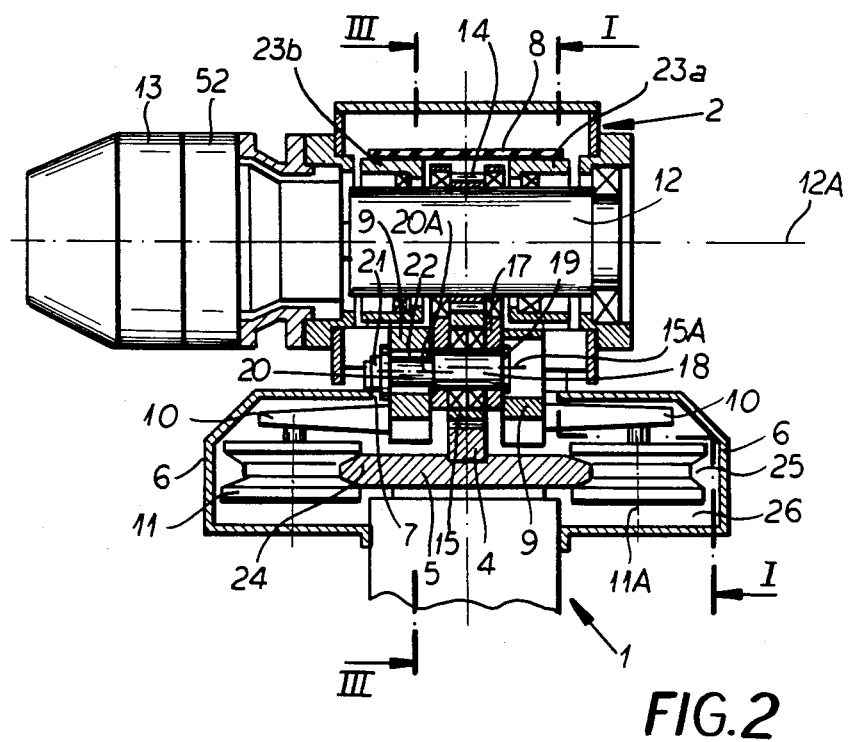
FIG. 2 is a vertical cross section taken along line II—II of FIG. 1.

As seen in FIGS. 1 through 4 a relatively stationary part 1 carries a relatively movable part 2, the latter formed generally as a downwardly open box provided with an interior rigid frame 9. The stationary part 1 carries a longitudinally extending guide 5 and a longitudinally extending rack 4, the latter with a longitudinally extending row of upwardly directed gear teeth 4A. In addition this stationary part 1 has a pair of side plates 6 defining a channel 26 that is upwardly open above the rack 4 at a longitudinally extending slot 7.

The frame 9 of the movable part 2 has at each longitudinal end a pair of transversely oppositely extending outriggers 10 carrying respective guide rollers 11 having grooves 25 that are complementary to the outwardly tapered edges 24 of the guide 5 which is here formed as a flat horizontal and longitudinal rail. These rollers 11 are at the extreme longitudinal ends of the frame 9 and the vertical axes 11A of the rollers 11 can be displaced somewhat horizontally transversely (perpendicular to the plane of the view in FIG. 1 and parallel thereto in FIG. 2) by conventional means so that the part 2 rides substantially without transverse play on the rail 5.

A motor 13 is fixed to one transverse side of the part 2 and is connected via a stepdown transmission 52 to a main drive shaft 12 centered on a horizontal axis 12A extending horizontally and transversely and fixed in the part 2. This shaft 12 carries a small-diameter input gear 14 of a gear train 3 connected to the rack 4 and including an intermediate gear 15 meshing on the one side with the gear 14 and on the other side with the rack 4.

Figure 3:
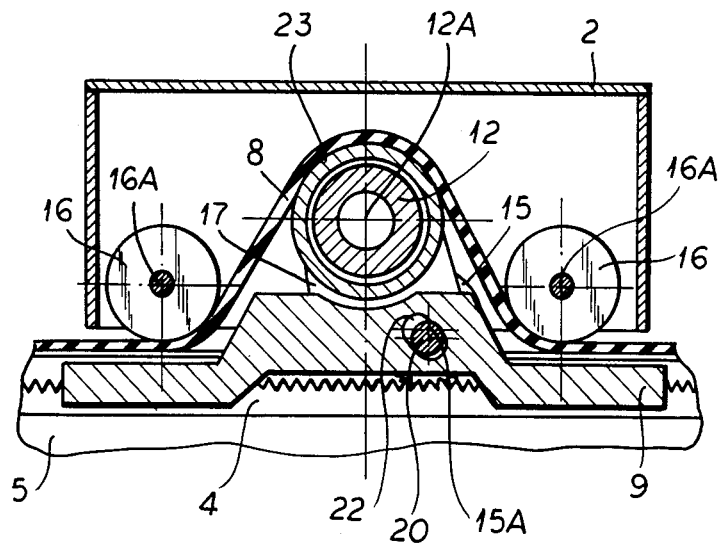
FIG. 3 is a vertical longitudinal section taken along line III—III of FIG. 2, line I—I of FIG. 2 generally indicating the section plane of FIG. 1.

This gear 15, which is rotatable about an axis 15A parallel to the axis 12A is carried on a shaft 18 centered on the axis 15A and journaled to both transverse sides of the gear 15 in a two-arm support fork 17 supported by bearings at its upper end on the shaft 12 to opposite sides of the gear 14 both arms of fork 17 being connected together by a bar 48. The shaft 18 is formed at one transverse end with a head 19 bearing transversely inward on the respective arm of the fork 17 and at its opposite end is formed with a small-diameter extension 20 centered on an axis 20A parallel to but eccentrically offset from the axis 15A. This projection 20 is snugly received in an adjustment slot 22 formed in the respective side of the frame 9 of the part 2 and extending as best seen in FIG. 3 along a line joining the axes 12A and 15A. The outer end of the projection 20 is threaded and carries a nut 21.

When the nut 21 is loose it is therefore possible to pivot the support arms 17 limitedly about the axis 12A, thereby varying the depth of mesh of the gear 15 in the rack 4 while not changing the mesh between the gears 14 and 15. Thus with the nut 21 loosened the mesh with the rack 4 is adjusted, whereupon this nut 21 is tightened to lock the desired setting, making it possible to compensate for wear of the guide wheels 11 or the like. The eccentric pin 20 allows for very fine adjustment by the rotation thereof about axis 15A.

According to this invention a relatively inextensible but flexible flat elastomer-covered textile belt 8 which is under substantial tension passes under two outer idler rollers 16 mounted on part 2 that are of cylindrical shape and extending at least the width of belt 8 and centered on axes 16A below the axis 12A and over an upper central roller formed by two roller halves 23a and 23b rotatably supported on the shaft 12 and flanking the gear 14 and fork 17. The diameter of these roller halves 23a and 23b is greater than the gear 14 so that the belt passes over this gear 14 and over the support fork 17 without touching these elements. To either side of the part 2 the belt 8 lies atop the side walls 6 of the stationary part 1, effectively covering and closing the slot 7 and thereby protecting the structure therein. This belt 8 therefore ensures that all of the moving structure is completely protected, as the rollers 11 remain in the channel 26 and all other structure is held in the box-like part 1.

It is also possible as shown in FIG. 5 to use a belt 8' that is not completely flat, but that instead has a central downwardly projecting ridge 28 that can in fact be a series of teeth, forming thinner outer sections 27. Thus this ridge 28 rides in the slot between the plates 6, keeping the belt centered. Such an arrangement is particularly useful in a retrofit of a system using a toothed-belt drive. Similarly FIG. 6 shows how guide strips 29 can be provided atop the side plates 6 to keep the belt 8 centered.

Figure 7:
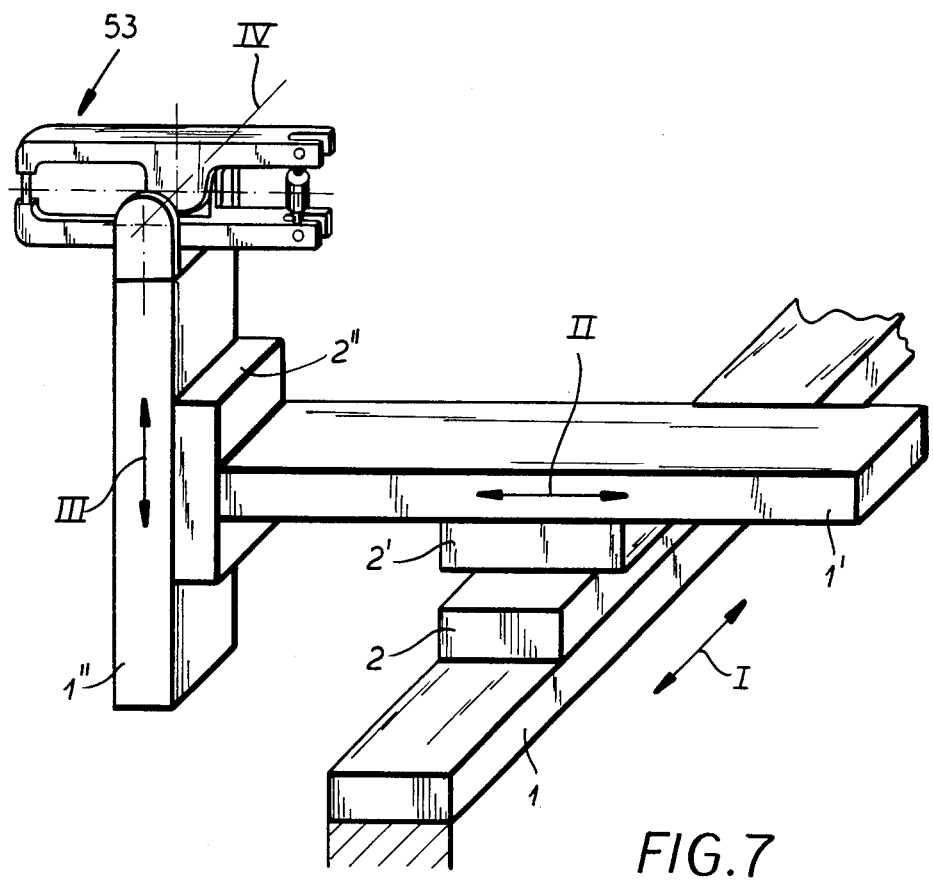
FIG. 7 is a largely schematic perspective view of a portion of a manipulator provided with drives according to this invention.

FIG. 7 shows in rough diagrammatic form an arrangement wherein the parts 1 and 2 are relatively displaceable in a first direction I. The part 2 carries another part 2' movable relative to another part 1' in a direction II perpendicular to the direction I, and in turn carrying a part 2" movable relative to a part 1" in a third direction III perpendicular to the directions I and II. A spot welder 53 can be pivotal on the part 1" about an axis IV parallel to the direction I and the part 1 can be fixed on a base, for use of the drive arrangement of this invention as part of a manipulator with three degrees of freedom.

Thus FIG. 7 makes it clear that the part carrying the rack and the part carrying the drive motor can be both movable, so that the term "stationary" is purely relative. In addition this drawing shows that the system of this invention is ideal for use as a manipulator with movement in three mutually perpendicular directions.

Figure 8:
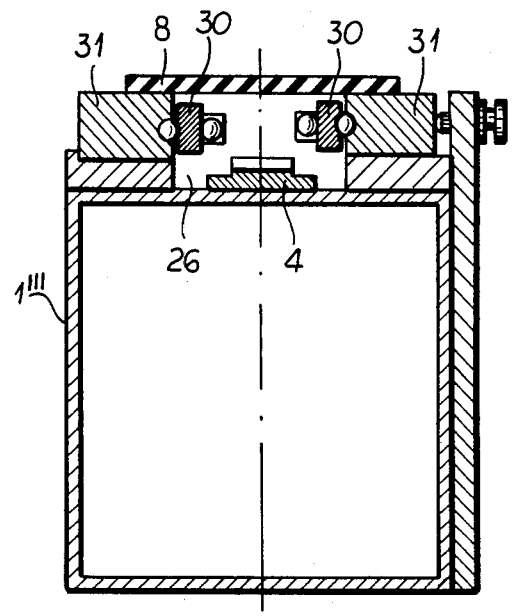
FIG. 8 is a vertical cross section through a second embodiment of the drive of this invention.

FIG. 8 shows a system where the part 1''' carries a pair of rails 31, one of which is movable toward the other which engage balls carried on recirculating guides 30 themselves carried on the unillustrated part 2. It would also be possible to have the balls of these guides 30 engage inwardly on a common such rail 31. The belt 8 lies atop the rails 31 and closes the channel 26 formed thereby.

Figure 9:
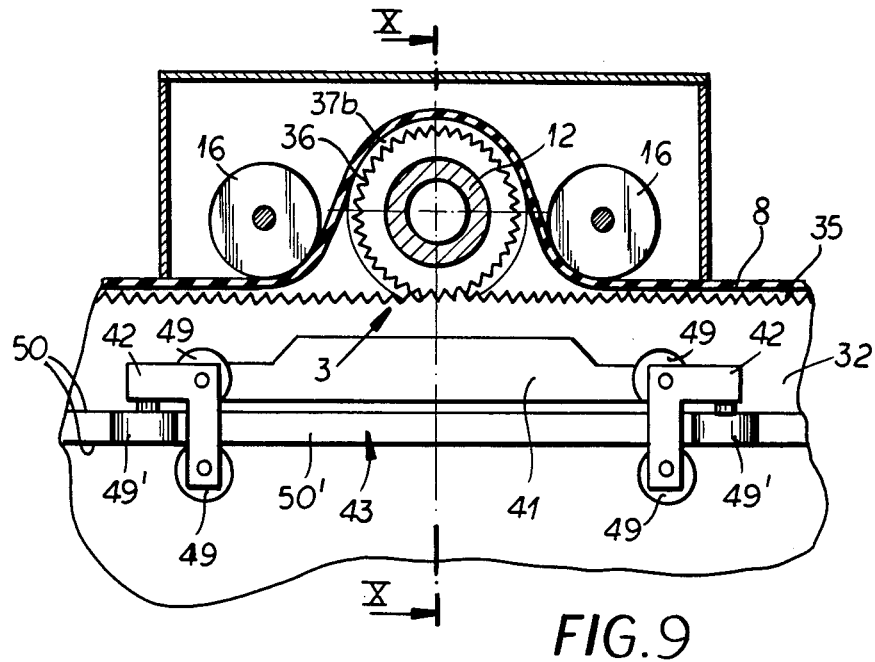
FIG. 9 is a vertical and longitudinal section similar to FIG. 1 through a third embodiment of the drive of the present invention.
Figure 10:
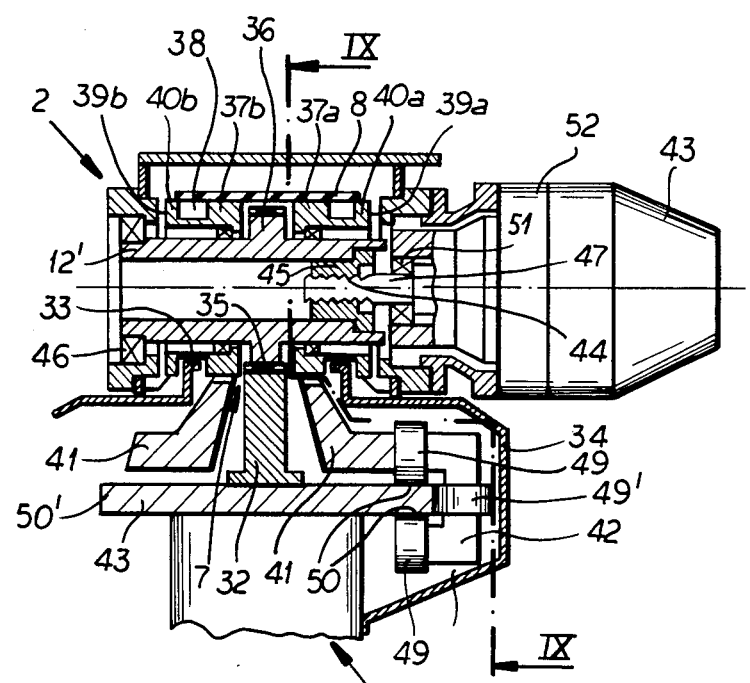
FIG. 10 is a vertical cross section taken along line X—X of FIG. 9, line IX—IX of FIG. 10 generally indicating the section plane of FIG. 9.

The arrangement of FIGS. 9 and 10 has direct drive, that is there is no structure equivalent to the intermediate gear 15, although otherwise reference numerals from FIGS. 1 through 4 are used for functionally equivalent structure.

In this arrangement the stationary part 1 carries a central upstanding rack 32 whose teeth 35 extend well above the upper surface of a square-section guide rail 43. In addition this part 1 has side walls 34 with upper edges 33 that define the slot 7 and that extend slightly above these teeth 35. The part 2 has a tubular drive shaft 12' journaled at its outer end in a bearing 46 carried in the frame 41 of this part 2 and an inner end in which is fixed a coupling sleeve 45 having an involute formation 44 coupling it to a stub shaft 47 of the transmission 52 of the motor 13, a bearing 51 supporting this shaft 47 on the part 2. The shaft 12' is formed with a small-diameter pinion 36 that meshes directly with the teeth 35 of the rack 32.

The central deflecting roller has two parts 37a and 37b of greater diameter than the gear 36 and on which the belt 8 rides and is formed with radially outwardly open grooves 38 in which the upper edges 33 of the walls 34 are received, permitting these edges 33 to extend up beyond the teeth 35 and define outer support rims 40a and 40b on which the flat belt 8 can also rest.

If a metal belt, such as steel is used it is possible to eliminate the outer portions of the rollers 40a and 40b, as the arcing of the belt will inherently prevent its longitudinal edges from folding over so that these edges will not have to be supported. In the illustrated embodiment the coaxial and identical rollers 37a and 37b are, like the rollers 23a and 23b, rotatably supported by roller bearings on the shaft 12', and have outer ends 39a and 39b that extend transversely somewhat beyond the respective belt edges.

In addition in this arrangement the frame 41 is provided with four sets of two rollers 49 and one roller 49' that engage respective guide surfaces 50 and 50' at the outer ends of the rail 43. Two of each set of rollers 49 are rotatable about horizontal and transverse axes and engage upper and lower surfaces 50 of the rail 43 and the third roller 49' is rotatable about a vertical axis and engages the vertical outer edge 50' thereof.

This arrangement is particularly useful where considerable force must be exerted by the drive 3, as the direct mesh of the gear 36 in the rack 32 permits considerable pressure to be transmitted.

To change the gear 36, which is the most wear-prone part of the system, the bearing 46 is pulled with the entire shaft and, normally, both rollers 37a and 37b. An entire new core can then be reinserted from the side to substantially refit the device.

I claim:
1. A rack-type drive for displacing a movable part longitudinally and horizontally relative to a stationary part, the drive comprising:
   a longitudinally extending rack fixed on one of the parts, the one part being formed above the rack with a longitudinal slot through which the rack is exposed upward, the other part being above the one part;
   a drive shaft rotatable about a horizontal and transverse upper axis on the other part and provided with a drive gear operatively engaged with the rack;
   a pair of outer idler rollers generally below and longitudinally flanking the drive gear and rotatable about respective horizontal and transverse lower axes;
   a pair of inner central rollers rotatable about the transverse axis on the drive shaft, coaxially flanking the drive gear, and having outer peripheries lying relative to the axis radially outside the gear; and
   a belt extending along and covering the slot to both longitudinal sides of the other part, passing under the outer idler rollers, and passing over the inner central rollers in engagement with the peripheries thereof but out of contact with the drive gear.

2. The rack-type drive defined in claim 1, further comprising:
   a support pivotal on the other part about the upper transverse axis;
   an intermediate gear rotatable on the support about an intermediate axis parallel to the transverse axis and meshing with the drive gear and down through the slot with the rack; and
   adjustment means for enabling the pivoting of the support on the other part about the upper transverse axis and thereby adjusting the mesh of the intermediate gear with the rack and for locking it in any of a plurality of angular positions on the other part.

3. The rack-type drive defined in claim 2 wherein the adjustment means includes an element centered on and rotatable in the support about the intermediate axis and having an offcenter projection, the other part being formed with an adjustment slot in which the offcenter projection engages, the adjustment means locking the element in any of a plurality of angular positions corresponding to the positions on the support.

4. The rack-type drive defined in claim 3 wherein the adjustment slot is elongated in a direction extending from the upper transverse axis to the intermediate axis.

5. The rack-type drive defined in claim 2 wherein the support is a pair of arms flanking the drive gear and the intermediate gear.

6. The rack-type drive defined in claim 1 wherein the drive gear meshes directly with the rack.

7. The rack-type drive defined in claim 1 wherein the one part is formed as a longitudinally extending channel that is transversely fully closed except at the elongated slot.

8. The rack-type drive defined in claim 7 wherein the one part has a pair of longitudinally extending and upright side plates having upper edges defining and delimiting the elongated slot.

9. The rack-type drive defined in claim 8 wherein the inner central rollers are formed with respective radially outwardly open grooves and the upper edges of the side plates project radially into the respective grooves.

10. The rack-type drive defined in claim 9 wherein the rack has upwardly directed teeth having upper edges lying immediately below the upper edges of the side plates.

11. The rack-type drive defined in claim 1 wherein the drive shaft is formed unitarily with the drive gear and is tubular with two axially opposite ends, the drive further comprising:
 a drive motor fixed on the other part and having an output shaft projecting into one end of the tubular drive shaft; and
 involute formations on the output shaft and the one end of the drive shaft rotationally coupling the output shaft and the drive shaft together.

12. The rack-type drive defined in claim 1, further comprising:
 a bearing rotatably supporting the output shaft of the motor on the other part; and
 a bearing rotatably supporting the other other end of the drive shaft on the other part.

13. The rack-type drive defined in claim 1, further comprising:
 a guide rail extending longitudinally on the one part and having a pair of opposite guide edges, the rack being fixed atop the guide rail; and
 rotatable guide rollers mounted on the other part and riding on the rail and its edges.

14. The rack-type drive defined in claim 13 wherein at least three such guide rollers engage each guide edge, one bearing downward, one bearing upward, and one bearing laterally.

15. The rack-type drive defined in claim 1 wherein the belt fits complementarily with the slot.

16. The rack-type drive defined in claim 1 wherein the belt is flexible and is made of a relatively inextensible material.

17. The rack-type drive defined in claim 1 wherein the parts are relatively movable parts of a manipulator movable in at least two dimensions.

18. The rack-type drive defined in claim 16 wherein the belt is made of steel.

* * * * *